United States Patent [19]
Kishihata

[11] Patent Number: 5,333,253
[45] Date of Patent: Jul. 26, 1994

[54] APPARATUS FOR WRITING A DOCUMENT UNDER TWO-DOCUMENT DISPLAY CONDITION

[75] Inventor: Hideyuki Kishihata, Yokohama, Japan

[73] Assignee: Matsushita Electric Industrial Co., Ltd., Osaka, Japan

[21] Appl. No.: 763,601

[22] Filed: Sep. 23, 1991

[30] Foreign Application Priority Data

Oct. 1, 1990 [JP] Japan ................................ 2-264031

[51] Int. Cl.$^5$ ............................................. G06F 15/62
[52] U.S. Cl. ..................................... 395/146; 395/157
[58] Field of Search ............... 340/723, 724, 721, 731; 395/144, 145, 146, 147, 148, 150, 110, 155, 161, 157, 153; 345/23, 55, 119, 120, 121, 123, 124, 127, 146

[56] References Cited

U.S. PATENT DOCUMENTS

| | | | |
|---|---|---|---|
| 4,254,409 | 3/1981 | Busby | 340/731 |
| 4,594,674 | 6/1986 | Bovlia et al. | 364/523 |
| 4,816,812 | 3/1989 | Iida | 340/721 |

FOREIGN PATENT DOCUMENTS 0156116 10/1985 European Pat. Off. ...... G09G 1/00

Primary Examiner—Heather R. Herndon
Attorney, Agent, or Firm—Stevens, Davis, Miller & Mosher

[57] ABSTRACT

A document writing apparatus capable of editing a document while simultaneously displaying another document in the same frame of a display. A unit for determining the display method is provided which selects, when two documents are simultaneously displayed, bisected display areas on which the two documents are respectively displayed so that the lines of the two documents are displayed in a series relationship with each other if the sum of the numbers of characters constituting one lines of the two documents is smaller than the maximum of the number of characters which can be displayed on the display in the widthwise direction, or are displayed in parallel with each other if the sum of the numbers of characters exceeds the maximum number of characters. The display method determining unit selects the number of dots constituting each displayed character so that the number of display dots is maximized within the limit of the predetermined maximum number of display dots.

5 Claims, 5 Drawing Sheets (DISPLAY USING 24-DOT CHARACTERS)

APPARATUS FOR WRITING A DOCUMENT UNDER TWO-DOCUMENT DISPLAY CONDITION

BACKGROUND OF THE INVENTION

This invention relates to a document writing apparatus which is operated to input words and sentences to edit a document while simultaneously displaying another document in the same frame.

Recently, many document writing apparatuses including word processors have been developed which are improved in operability by adding a function of enabling the operator to write a document while simultaneously referring to another document previously written. For this kind of conventional document writing apparatus, a method for simultaneously displaying two documents in one frame has been used in which the area of one frame is bisected into left and right or upper and lower sections, an edited main document being displayed in the left or upper section, a sub document read out to be referred to or copied being displayed on the right or lower section.

FIG. 1 is a block diagram of the construction of a conventional document writing apparatus. A component 1 shown in FIG. 1 is a character input means for inputting characters of kana, kanji, English characters, Arabic numerals and the like. An array of input characters is changed by proofreading and/or edited by an editing means 2 while being displayed by a display means 3. Documents thereby formed are stored by a document storage means 4, and each of the documents can be printed by a printing means 5 if necessary.

At the time of document inputting/editing, a portion of a document which has already been prepared and stored by the document storage means 4 may be used in a document presently edited or may be referred to for editing. In such a case, the two documents are displayed in the same frame by using a two-document invoking means 6, and character inputting/editing are performed under this condition to edit the document.

The operation of this conventional apparatus will be described below with reference to FIGS. 2a to 2d, and FIGS. 3a and 3b.

It is assumed here that display means using 24-dot characters, 16-dot characters and 12-dot characters are provided as the display means of this apparatus, and that while a first document shown in FIG. 2a (35 characters × 25 lines per page on a B5 sheet) is being edited and displayed in a one-document display state shown in FIG. 2d by using 24-dot characters, the apparatus is instructed to effect two-document display and reads out a second document shown in FIG. 2b (40 characters × 35 lines per page on an A4 sheet) by using the two-document invoking means 6. The contents of the two-document display are thereby displayed on the screen as shown in FIG. 3q. In the two-document display state shown in FIG. 3a, each line of the main and sub documents cannot be entirely displayed, and a troublesome operation of scrolling of each document in the direction of line length is required to edit the document.

In the case of a combination of a third document (90 characters × 25 lines per page on a B4 sheet) and the first document, the two-document display state is as shown in FIG. 3b, and the extent of scrolling is further increased. In such a case, the operator selects the 16 dot character display means which enables an increase in the number of characters displayed on one line while limiting the reduction in the character size so that each character is easy to read, and which can avoid occurrence of a need for scrolling. The operator also changes the display system and establishes a two-document display state shown in FIG. 5a by selecting the position at which the left and right sections for displaying the two documents are divided so that there is no need to scroll one or both of the two documents. Thereafter, the operator inputs characters and edits the document.

In the conventional document writing apparatus, however, the dot construction of each character and the position at which the frame area is divided for two-document display are fixed with respect to each apparatus, and, to establish a two-document display condition free from occurrence of a need for scrolling one or both of the main and sub documents, it is necessary for the operator to change the display system and the display condition by considering both the formats of the two documents read out and the display means provided in the apparatus.

SUMMARY OF THE INVENTION

In view of this problem, an object of the present invention is to provide an improved document writing apparatus capable of selecting, at a stage of changing the display condition for two-document display from a one-document display condition, a two-document display condition free of occurrence of a need for scrolling one or both of the main and sub documents in the direction of line length.

To achieve this object, according to the present invention, there is provided a document writing apparatus capable of inputting and editing a document while simultaneously displaying another document in the same frame of a display, the apparatus having a display method determining means for displaying two documents by determining bisected display areas on which the two documents are respectively displayed so that the lines of the two documents are displayed in a series relationship with each other if the sum of the numbers of characters constituting one line of the two documents is smaller than the maximum number of characters which can be displayed by a display means in the widthwise direction, or are displayed in parallel with each other if the sum of the numbers of characters exceeds the maximum number of displayed characters.

The operation of the display method determining means of this document writing apparatus in accordance with the present invention is as described below. When the sum of the numbers of characters constituting one line of two documents to be displayed is smaller than the maximum number of characters displayed by the display means in the widthwise direction, the blank space on the display means left after determining the area for displaying one of the two documents is large enough to fully display the number of characters constituting each line of the other document, and the other document can be inserted and displayed in the left space. The two documents can thereby be displayed while setting their lines in a series relationship with each other so that the number of characters -constituting each of their lines are entirely displayed, and so that there is no need for scrolling. If the sum of the number of characters mentioned above exceeds the maximum number of characters displayed by the display means, some portion cannot be displayed by the above display method, and a need for scrolling for such portion arises. In this case, the number of displayed lines of one of the two documents is reduced to provide a blank space generally equal to half of the display area of the display means, and the other document is inserted in this space, thereby displaying the two documents in the bisected areas while setting the lines parallel. In this case, the number of displayed lines is reduced but the number of characters constituting each line can be completely displayed with some margin, and there is therefore no need for scrolling.

Thus, the display method determining means detects information and determines the desired method, so that a two-document display condition free from a need for scrolling can be realized automatically.

DESCRIPTION OF THE PREFERRED EMBODIMENT

Figure 1:
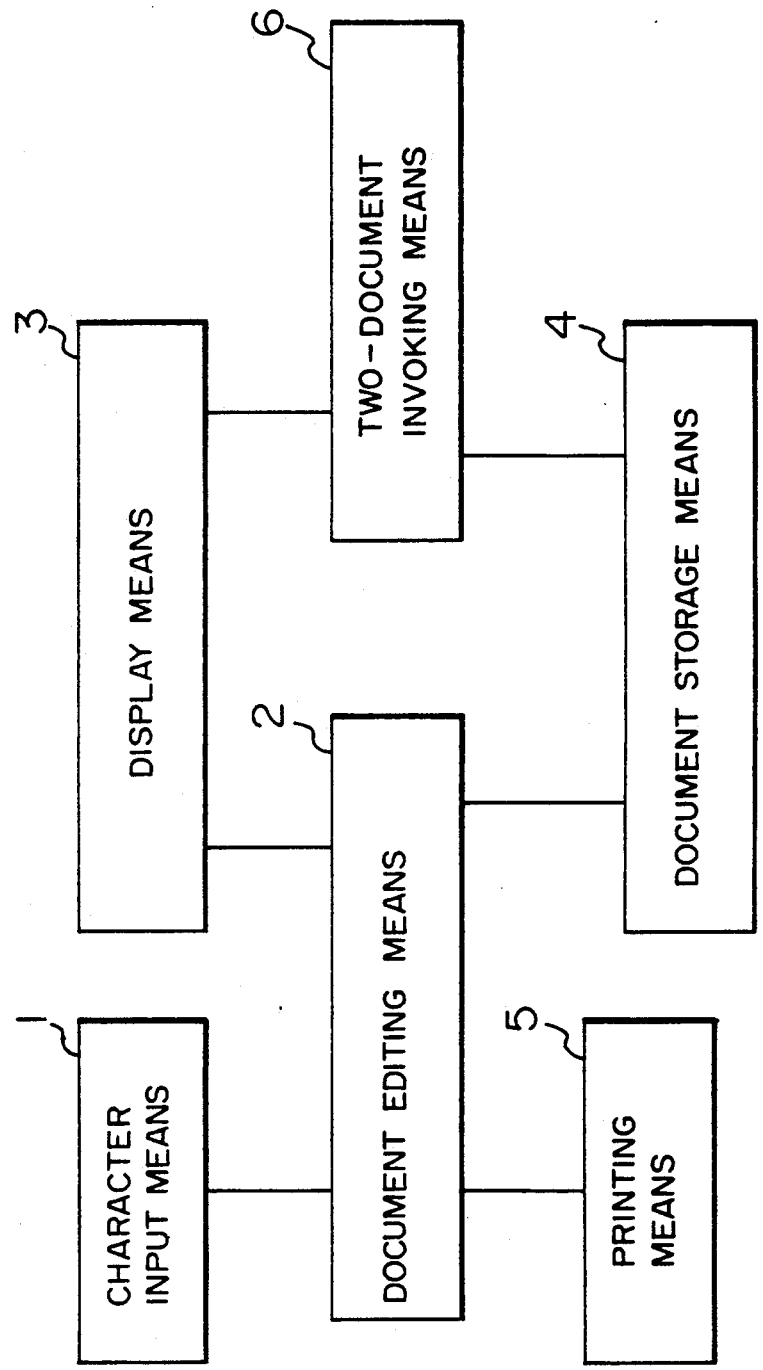
FIG. 1 is a schematic block diagram of the construction of the conventional document writing apparatus.
Figure 4:
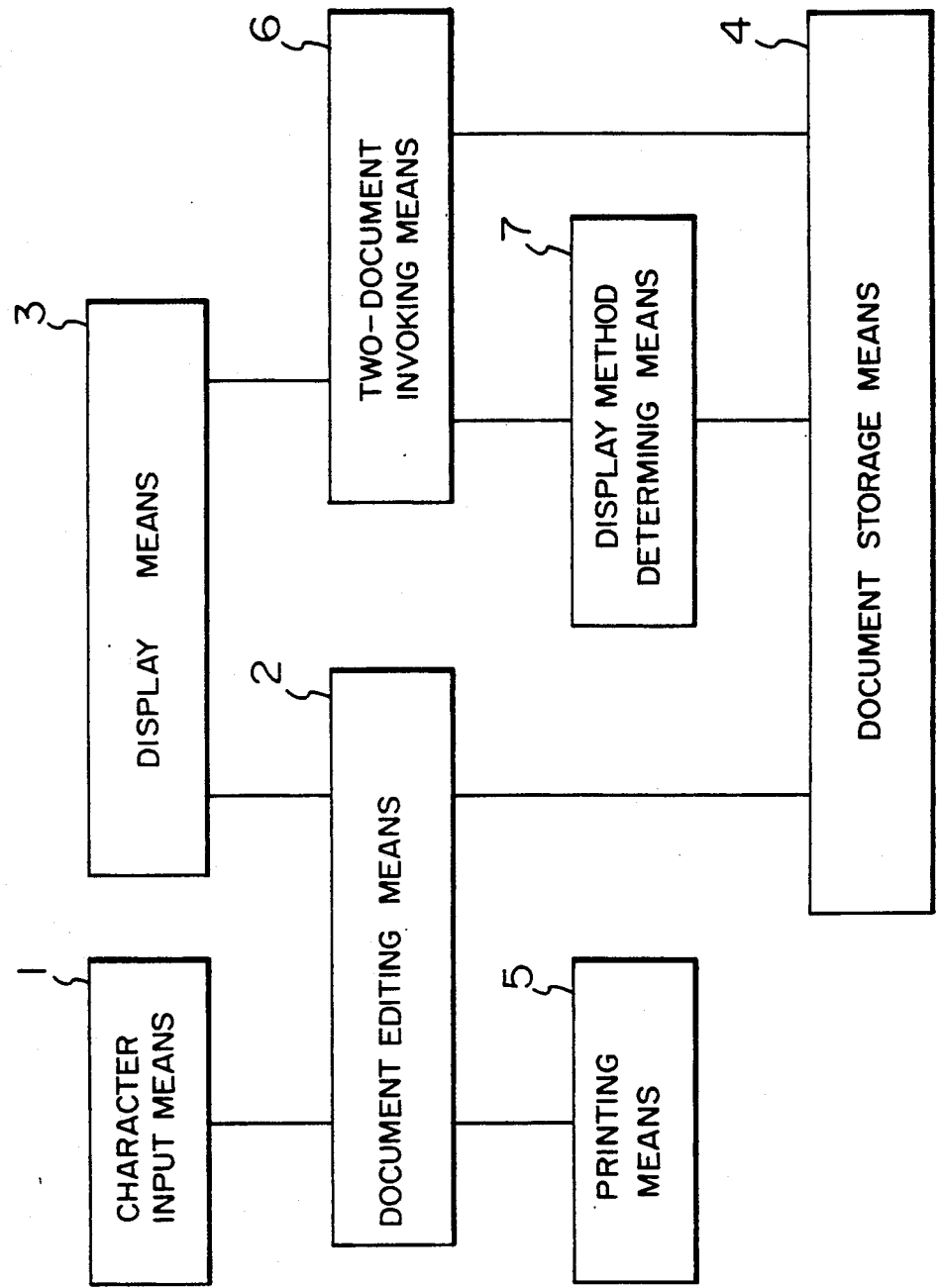
FIG. 4 is a block diagram of an embodiment of the present invention.

As shown in FIG. 4, a document writing apparatus in accordance with an embodiment of the present invention includes components 1 to 6 which are the same as those of the conventional apparatus shown in FIG. 1 or have the same functions, and a display method determination means 7.

The display method determination means 7 is capable of selecting a two-document display condition free from a need for scrolling in the direction of line length by selecting characters according to display means 3 provided in the apparatus and the formats of main and sub documents so as to maximize the number of dots constituting the characters in a range such that selected characters can be displayed by the apparatus.

Figure 5A:
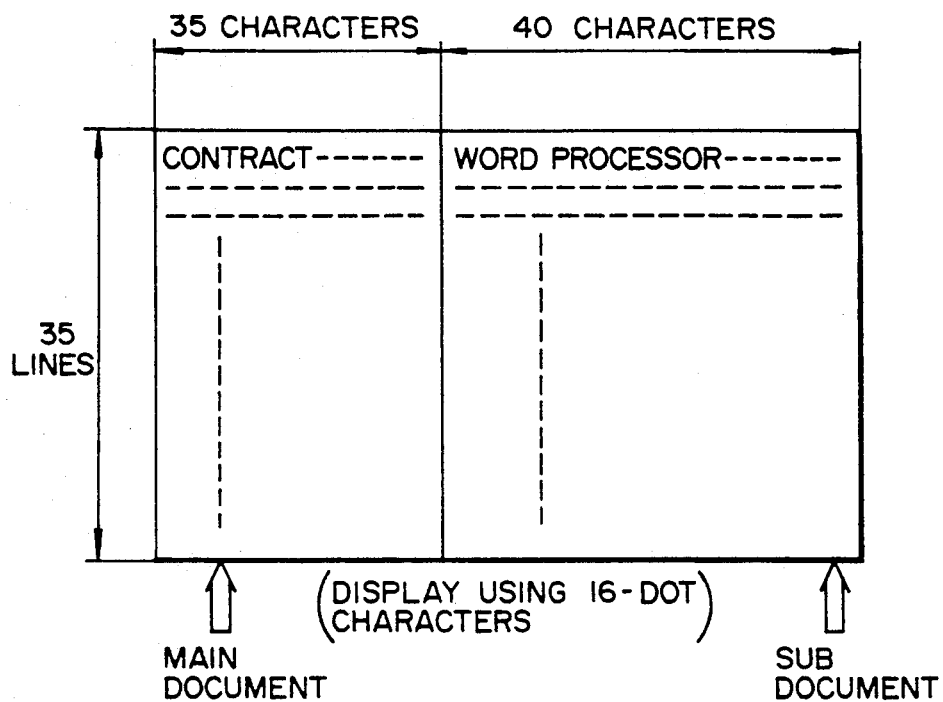
FIGS. 5a and 5b are display patterns in accordance with the embodiment of the present invention.

The operation of this embodiment will be described below with reference to FIGS. 5a and 5b. The relationship between the size of characters (the number of dots constituting each character) displayed by the display means provided in the apparatus and the number of characters constituting each line and the number of lines on one frame is such that one frame contains 50 characters ×20 lines in the case of 24-dot characters, characters × 35 lines in the case of 16-dot characters, or 100 characters × 40 lines in the case of 12-dot characters, as shown in the following table.

| <Relationship between the size of displayed characters and the number of characters constituting each line and the number of lines on one frame> | |
|---|---|
| The size of characters displayed in one frame | The number of lines and the number of characters constituting each line which can be displayed in one frame |
| 24 × 24 dots | 50 characters × 20 lines |
| 16 × 16 dots | 75 characters × 35 lines |
| 12 × 12 dots | 100 characters × 40 lines |

Figure 2A:
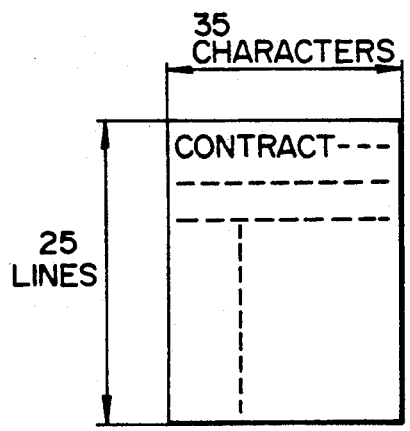
FIGS. 2a to 2d are diagrams of the formats of documents processed by the conventional document writing apparatus.
Figure 2B:
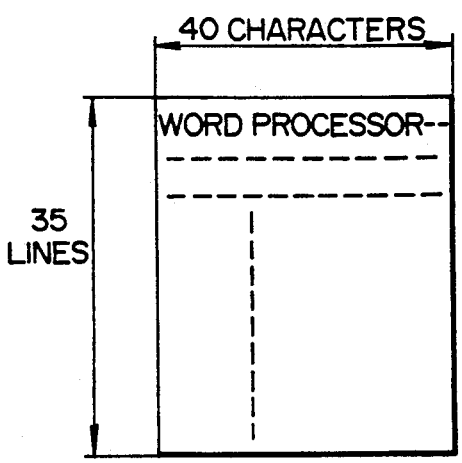
Figure 3A:
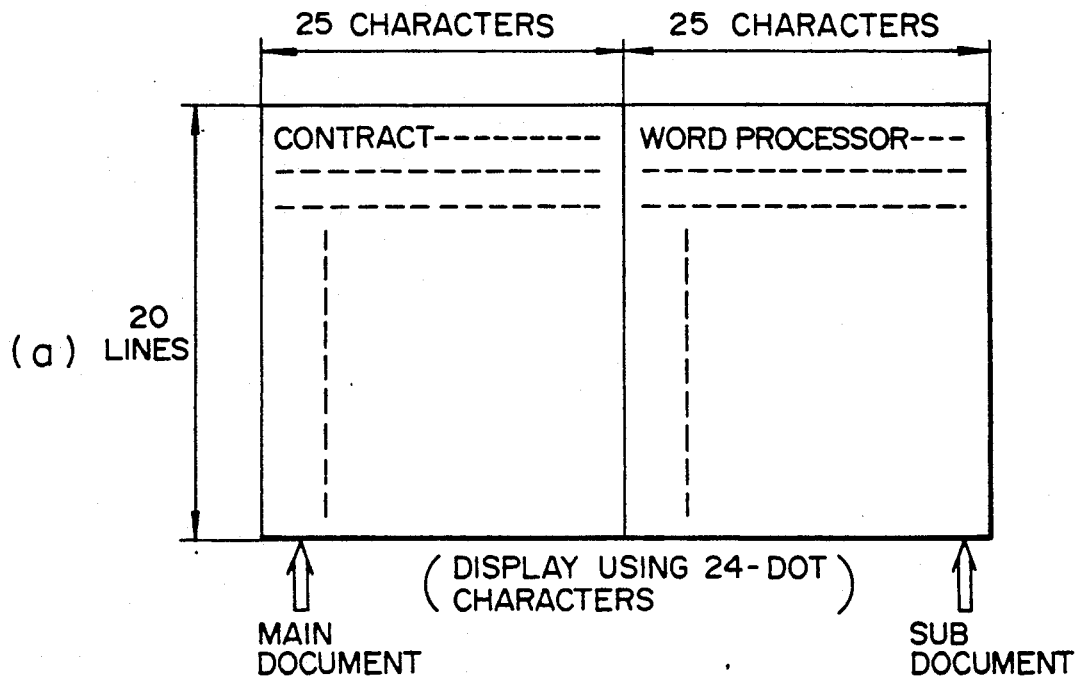
FIGS. 3a and 3b are diagrams of display patterns of the conventional apparatus.

During writing of a first document (35 characters × 25 lines per page on a B5 sheet) in a one-document display state with 24-dot characters as shown in FIG. 2a, the apparatus is instructed to effect two-document display by reading out a second document such as that shown in FIG. 2b (40 characters × 35 lines per page on an A4 sheet) by two-document invoking means 6. In the conventional operation, as described above, the frame is divided into left and right sections having equal areas while 24-dot characters are used as in the case of the one-document display state, the first document which is a main document is displayed in the left section in the format of 25 characters × 20 lines and the second document which is a sub document is displayed in the right section in the format of 25 characters × 20 lines, as in the case of the two-document display state shown in FIG. 3a. Since in the two-document display state shown in FIG. 3a each line of the main and sub documents cannot be entirely displayed, it is necessary to scroll each of the main and sub documents in the direction of line length during document inputting/editing.

To solve this problem, the display method determination means 7 is used to determine the two-document display method by considering the numbers of characters constituting the main and sub documents, the types of dot constructions of characters which can be displayed by the apparatus and the format of characters × lines which can be displayed in one frame. In a case where the second document is displayed as a sub document by two-document displaying, it is displayed in a two-document display state as shown in FIG. 5a. That is, the display method determination means 7 selects the display method using 16-dot characters to display the documents in this two-document display state in the frame by selecting the dividing position in one frame so that the main document is displayed in the format of 35 characters × 35 lines while the sub document is displayed in the format of 40 characters × 35 lines. Under this two-document display condition, document inputting/editing can be performed without scrolling the main and sub document in the direction of line length.

The greatest one of the sizes of characters which can be displayed while avoiding scrolling in this case is selected. If 24-dot characters are used, scrolling is required.

Figure 2C:
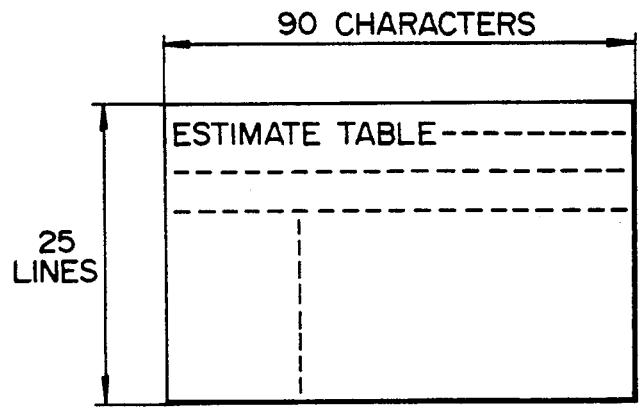
Figure 2D:
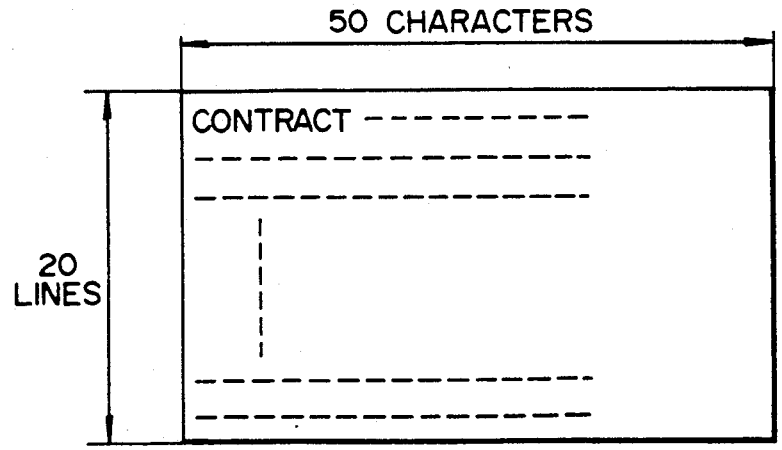
Figure 3B:
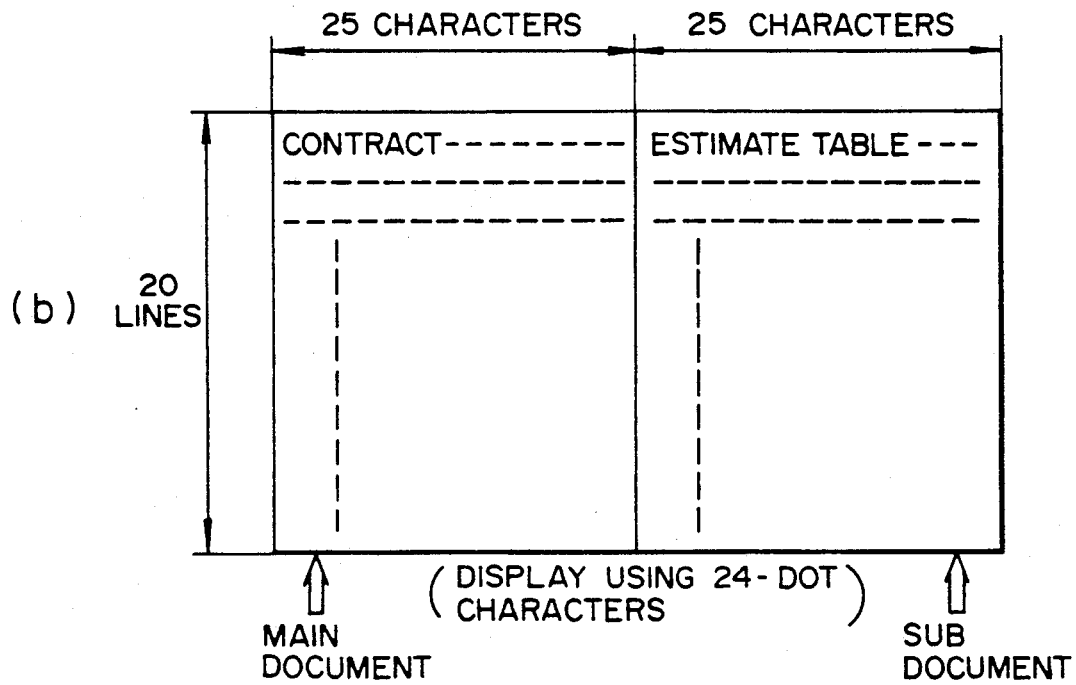
Figure 5B:
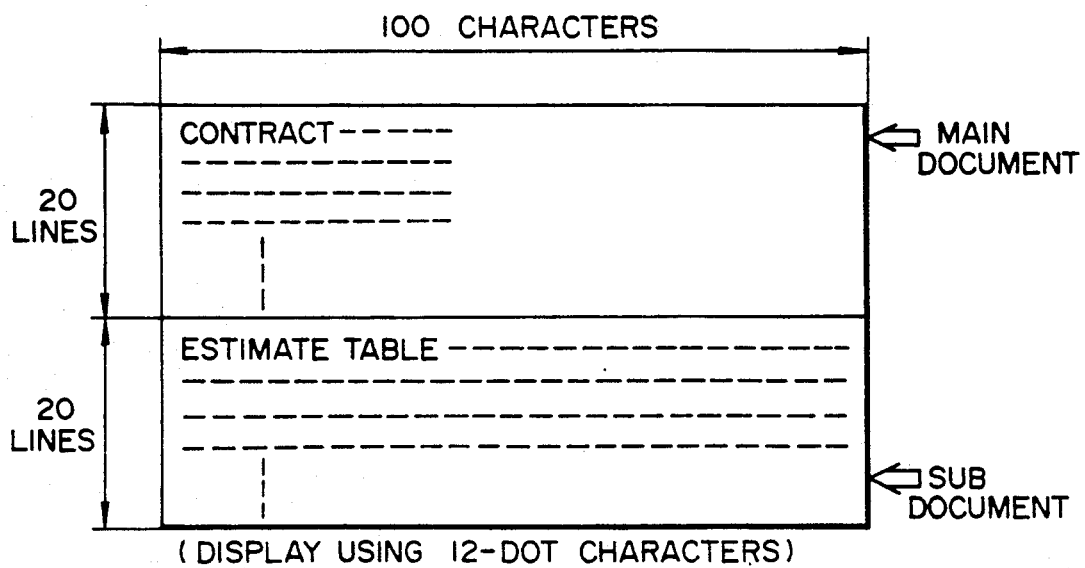

FIG. 5b shows another example of two-document display in which a third document such as that shown in FIG. 2c (90 characters × 25 lines per page on a B4 sheet) is displayed as a sub document with respect to the first document in the format of FIG. 2a. In the conventional operation, the contents of two-document display shown in FIG. 3b are displayed in the frame. In accordance with the embodiment of the present invention, the display method determination means 7 recognizes that each line of the third document is constituted by 90 characters, employs 12-dot characters to avoid occurrence of a need for scrolling during two-document display, and displays the documents in a two-document display state, such as that shown in FIG. 5b, in which the frame is divided into upper and lower sections. Thus, the display method determination means effects two-document display by maximizing the number of dots constituting each character and by detecting a condition for eliminating a need for scrolling. It is thus possible to realize a document writing apparatus easy to see and improved in operability.

In accordance with the present invention, as is apparent from the above description, a display method determination means is provided which enables a two-document layout in which the number of dots for constituting each character is maximized and which is free from a need for scrolling in the direction of the line length, thereby achieving the following advantage.

At a stage of change from one-document display to two-document display, a two-document display condition free from occurrence of a need for scrolling both of the main and sub documents is determined according to the formats of the main and sub documents and the sizes of characters which can be displayed by the apparatus. It is therefore possible for the operator to easily perform document inputting/editing immediately after inputting a two-document display instruction.

What is claimed is:

1. A document writing apparatus comprising:

character inputting means for inputting characters in sequence to form documents;

document editing means for editing said documents;

display means for displaying said documents;

document storage means for storing said documents;

document invoking means for reading out a plurality of said documents from said document storage means and for providing said plurality of said documents to said display means for simultaneous display on said display means; and display method determination means for determining, when said plurality of said documents are to be simultaneously displayed on said display means, divided display areas of aid display means on which the plurality of said documents are respectively to be simultaneously displayed wherein lines of the plurality of said documents are displayed in a series relationship with each other if a sum of numbers of characters per line in the plurality of said documents is smaller than a maximum number of characters which can be displayed by said display means in a widthwise direction, and wherein the lines of the plurality of said documents are displayed in parallel with each other if said sum of the numbers of characters exceeds said maximum number of characters.

2. A document writing apparatus according to claim 1, wherein said display method determination means comprises means for selecting a number of display dots that constitutes one displayed character so as to maximize a number of display dots used to display said plurality of said documents to permit full display of the lines of said plurality of documents in said widthwise direction at a size as large as possible within a limit of a predetermined maximum number of display dots for said display means that may constitute one displayed character.

3. A document writing apparatus according to claim 2, wherein said number of dots constituting one displayed character is selected from a plurality of predetermined numbers of dots.

4. A document writing apparatus according to claim 2, wherein, when said lines of said plurality of said documents are displayed in said series relationship, said display method determination means selects said number of dots constituting one displayed character to be a maximum number consistent with full display of said sum of said numbers of characters, whereby a need for horizontal scrolling is avoided.

5. A document writing apparatus according to claim 2, wherein, when said liens of said plurality of said documents are displayed in parallel, said display method determination means selects said number of dots constituting one displayed character to be a maximum number consistent with full display of each of said lines in said widthwise direction, whereby a need for horizontal scrolling is avoided.

* * * * *